(12) United States Patent
Tateishi et al.

(10) Patent No.: US 10,904,420 B2
(45) Date of Patent: Jan. 26, 2021

(54) CONTROL DEVICE AND CONTROL METHOD FOR MANAGING A CAPTURED IMAGE

(71) Applicant: SONY CORPORATION, Tokyo (JP)

(72) Inventors: Chikako Tateishi, Kanagawa (JP); Kazuki Nakamura, Tokyo (JP); Morio Omata, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 46 days.

(21) Appl. No.: 16/087,182

(22) PCT Filed: Mar. 2, 2017

(86) PCT No.: PCT/JP2017/008315
§ 371 (c)(1),
(2) Date: Sep. 21, 2018

(87) PCT Pub. No.: WO2017/169499
PCT Pub. Date: Oct. 5, 2017

(65) Prior Publication Data
US 2019/0104257 A1    Apr. 4, 2019

(30) Foreign Application Priority Data

Mar. 31, 2016  (JP) .................. 2016-070591

(51) Int. Cl.
*H04N 5/232* (2006.01)
*H04N 5/262* (2006.01)
(Continued)

(52) U.S. Cl.
CPC ......... *H04N 5/232* (2013.01); *H04N 5/23203* (2013.01); *H04N 5/232127* (2018.08);
(Continued)

(58) Field of Classification Search
CPC .......... H04N 5/2621; H04N 5/232172; H04N 21/8456; H04N 21/4312; H04N 5/232; H04N 21/6587; H04N 5/23203
See application file for complete search history.

(56) References Cited

U.S. PATENT DOCUMENTS

2004/0101212 A1    5/2004 Fedorovskaya et al.
2005/0105888 A1*   5/2005 Hamada ............... G11B 19/025
                                                      386/230
(Continued)

FOREIGN PATENT DOCUMENTS

CN    1510903 A    7/2004
CN    1645413 A    7/2005
(Continued)

OTHER PUBLICATIONS

International Search Report and Written Opinion of PCT Application No. PCT/JP2017/008315, dated May 16, 2017, 16 pages of English Translation and 10 pages of ISRWO.
(Continued)

*Primary Examiner* — Ahmed A Berhan
(74) *Attorney, Agent, or Firm* — Chip Law Group

(57) ABSTRACT

Provided is a control device including a control unit that determines a concentrating state of a creator of content and changes an effect on the content between a first part where a concentrating state to the content of a creator of the content is detected in the content and a second part different from the first part.

19 Claims, 17 Drawing Sheets

(51) Int. Cl.
*H04N 21/431* (2011.01)
*H04N 21/845* (2011.01)
*H04N 21/6587* (2011.01)

(52) U.S. Cl.
CPC ....... *H04N 5/2621* (2013.01); *H04N 21/4312* (2013.01); *H04N 21/6587* (2013.01); *H04N 21/8456* (2013.01)

(56) References Cited

U.S. PATENT DOCUMENTS

| | | | |
|---|---|---|---|
| 2005/0159958 A1 | 7/2005 | Yoshimura | |
| 2007/0091204 A1* | 4/2007 | Koshimizu | G09G 5/36 348/441 |
| 2011/0134311 A1* | 6/2011 | Nagao | H04N 5/23212 348/349 |
| 2015/0097982 A1* | 4/2015 | Tomizawa | H04N 5/23229 348/222.1 |
| 2015/0356738 A1* | 12/2015 | Yoon | G06T 5/50 348/47 |
| 2017/0024110 A1* | 1/2017 | Xu | G06F 3/04817 |

FOREIGN PATENT DOCUMENTS

| | | |
|---|---|---|
| EP | 1422639 A2 | 5/2004 |
| EP | 1555635 A1 | 7/2005 |
| JP | 2004-178593 A | 6/2004 |
| JP | 2005-202854 A | 7/2005 |
| JP | 2009-111843 A | 5/2009 |
| JP | 2012-257112 A | 12/2012 |
| JP | 2014-171196 A | 9/2014 |
| JP | 2015-073222 A | 4/2015 |
| JP | 2016-012927 A | 1/2016 |

OTHER PUBLICATIONS

International Preliminary Report on Patentability of PCT Application No. PT/JP2017/008315, dated Oct. 11, 2018, 17 pages of English Translation and 17 pages of IPRP.

* cited by examiner

FIG. 13
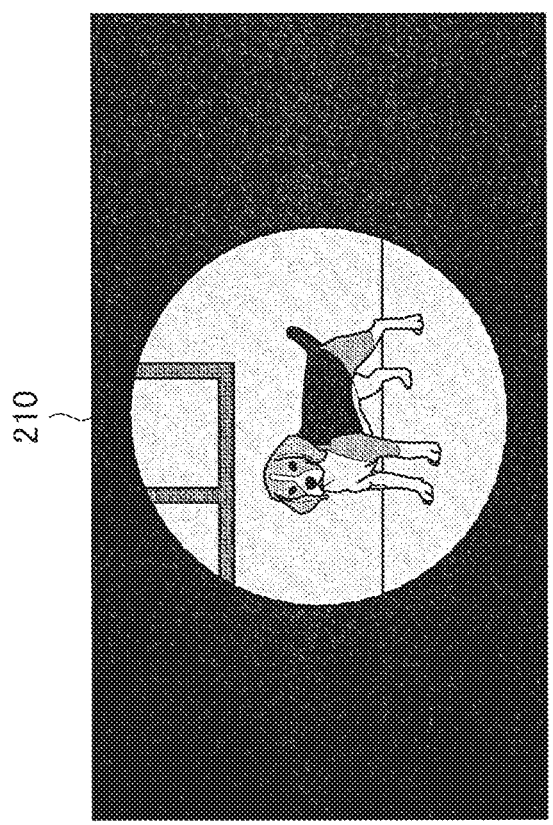
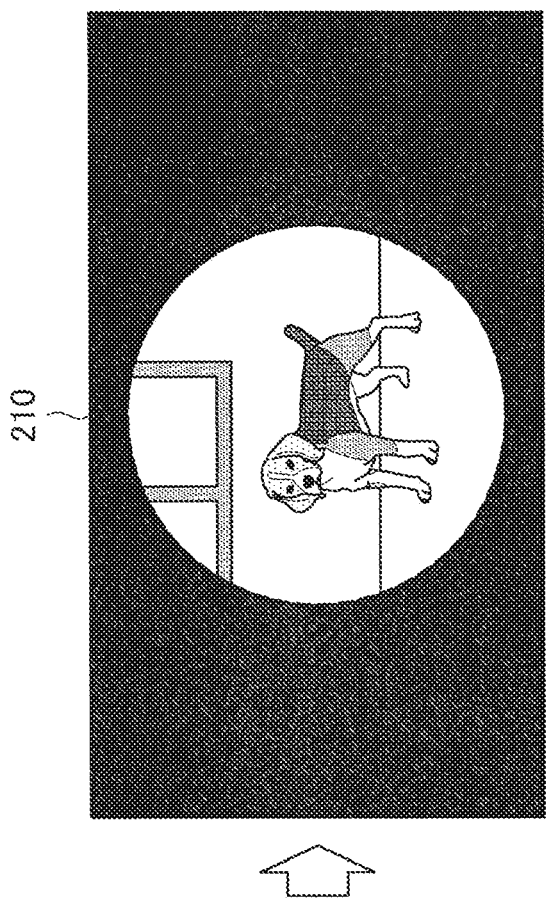

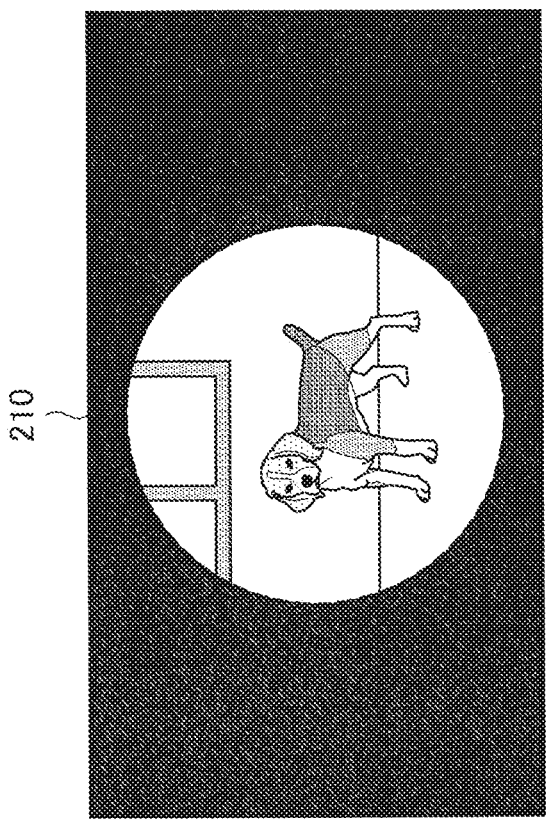
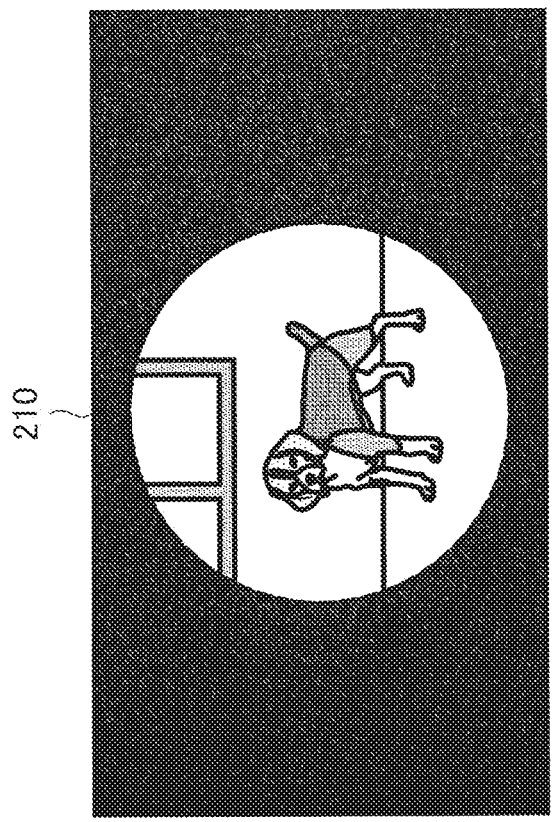
FIG. 14

FIG. 16A

| | CONDITION OF IMAGING TARGET | | | | |
|---|---|---|---|---|---|
| | MACRO (STILL LIFE SUCH AS FLOWER, OBJECT, AND MEAL) | LANDSCAPE | NIGHT SCENE | PERSON | SUBJECT WITH LARGE MOTION |
| CIRCLE IS SMALLER | 2 | 2 | 0 | 2 | 0 |
| SURROUNDINGS OF FOCUSING POINT ARE BLURRED | 2 | 2 | 0 | 2 | 0 |
| CHANGE FROM MONOCHROME TO COLOR | 2 | 2 | 0 | 2 | 2 |
| REPRODUCING SPEED CHANGES | 1 | 0 | 0 | 1 | 2 |
| USE PICTURE EFFECT | 2 | 2 | 1 | 2 | 2 |
| SHAPE OF CIRCLE CHANGES | 2 | 2 | 0 | 2 | 1 |
| BALANCE OF BGM CHANGES | 2 | 1 | 1 | 2 | 2 |

FIG. 16B

| | CONDITION OF IMAGING ENVIRONMENT | | | CONDITION OF USER | | |
|---|---|---|---|---|---|---|
| | WEATHER : FINE BRIGHTNESS: BRIGHT | WEATHER: RAIN, ETC. BRIGHTNESS: DARK | AT TIME WHEN MOTION OF FOCUSING POINT STOPS AT ONE POINT OR WITHIN CERTAIN RANGE | HEART RATE SHARPLY CHANGES | JOY, ANGER, SADNESS, OR PLEASURE CHANGES | NUMBER OF BLINKS SHARPLY CHANGES |
| CIRCLE IS SMALLER | 2 | 0 | 2 | 2 | 1 | 1 |
| SURROUNDINGS OF FOCUSING POINT ARE BLURRED | 2 | 0 | 2 | 2 | 1 | 2 |
| CHANGE FROM MONOCHROME TO COLOR | 2 | 0 | 1 | 1 | 2 | 2 |
| REPRODUCING SPEED CHANGES | 2 | 0 | 1 | 2 | 1 | 1 |
| USE PICTURE EFFECT | 2 | 2 | 2 | 1 | 2 | 1 |
| SHAPE OF CIRCLE CHANGES | 2 | 0 | 2 | 1 | 2 | 1 |
| BALANCE OF BGM CHANGES | 2 | 2 | 2 | 2 | 2 | 1 |

FIG. 17

| | CONDITION OF IMAGING TARGET | | |
|---|---|---|---|
| | TOTAL VALUE OF CONDITION OF IMAGING TARGET = A | TOTAL VALUE OF CONDITION OF IMAGING ENVIRONMENT = B | TOTAL VALUE OF CONDITION OF USER = C |
| CIRCLE IS SMALLER | A≥4 | B≥2 | C≥4 |
| SURROUNDINGS OF FOCUSING POINT ARE BLURRED | A≥4 | B≥2 | C≥5 |
| CHANGE FROM MONOCHROME TO COLOR | A≥6 | B≥2 | C≥4 |
| REPRODUCING SPEED CHANGES | A≥3 | B≥2 | C≥4 |
| USE PICTURE EFFECT | A≥6 | B≥2 | C≥3 |
| SHAPE OF CIRCLE CHANGES | A≥5 | B≥2 | C≥4 |
| BALANCE OF BGM CHANGES | A≥5 | B≥2 | C≥5 |

CONTROL DEVICE AND CONTROL METHOD FOR MANAGING A CAPTURED IMAGE

CROSS REFERENCE TO RELATED APPLICATIONS

This application is a U.S. National Phase of International Patent Application No. PCT/JP2017/008315 filed on Mar. 2, 2017, which claims priority benefit of Japanese Patent Application No. JP 2016-070591 filed in the Japan Patent Office on Mar. 31, 2016. Each of the above-referenced applications is hereby incorporated herein by reference in its entirety.

TECHNICAL FIELD

The present disclosure relates to a control device, a control method and a computer program.

BACKGROUND ART

A technology for efficiently managing an image captured by an imaging device is disclosed. For example, Patent Literature 1 discloses a technology for enabling different use with propriety and ease of an image that is automatically captured by an imaging device and an image at timing corresponding to a shutter operation of a user.

CITATION LIST

Patent Literature

Patent Literature 1: JP 2009-111843A

DISCLOSURE OF INVENTION

Technical Problem

However, in general, an image is conventionally displayed, directly as a captured image. There is no display of both the image and a concentration degree to a subject of an imaging person.

Accordingly, the present disclosure proposes novel and improved control device, control method, and computer program capable of more visibly presenting that a creator of content concentrates on a target of the content.

Solution to Problem

According to the present disclosure, there is provided a control device including: a control unit that changes an effect on content between a first part where a concentrating state to the content of a creator of the content is detected in the content and a second part different from the first part.

In addition, according to the present disclosure, there is provided a control method including: detecting a concentrating state to content of a creator of the content in the content; and changing an effect on the content between a first part where the concentrating state is detected and a second part different from the first part.

In addition, according to the present disclosure, there is provided a computer program that causes a computer system to execute: detecting a concentrating state to content of a creator of the content in the content; and changing an effect on the content between a first part where the concentrating state is detected and a second part different from the first part.

Advantageous Effects of Invention

According to the present disclosure as described above, it is possible to provide novel and improved control device, control method, and computer program capable of more visibly presenting that the creator of content concentrates on a target of the content.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 13 is an explanatory diagram illustrating an example of an effect given on a moving image reproduced by the mobile terminal 200.

FIG. 14 is an explanatory diagram illustrating an example of an effect given on a moving image reproduced by the mobile terminal 200.

FIG. 16A is an explanatory diagram illustrating an example of individually scoring a condition of an imaging target, a condition of imaging environment, and a condition of an imaging person.

FIG. 16B is an explanatory diagram illustrating an example of individually scoring a condition of an imaging target, a condition of imaging environment, and a condition of an imaging person.

FIG. 17 is an explanatory diagram illustrating an example of a table for determining which effect the mobile terminal 200 applies.

MODE(S) FOR CARRYING OUT THE INVENTION

Figure 1:
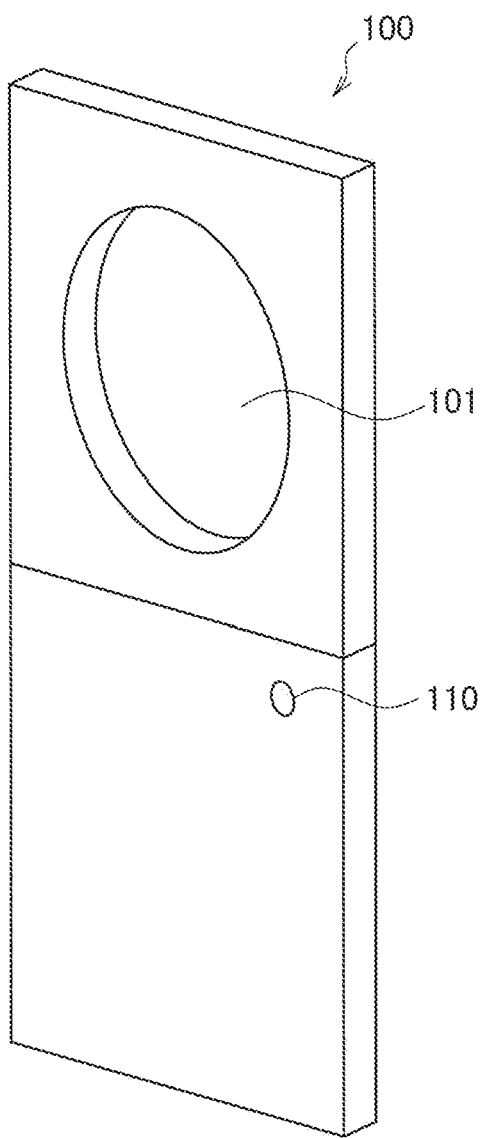
FIG. 1 is an explanatory diagram illustrating an appearance example of an imaging device 100 according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

It is noted that the explanation is given in the following order.
1. Embodiment according to the present disclosure
 1.1. Appearance example of imaging device
 1.2. Use example of imaging device
 1.3. Functional configuration example of imaging device
 1.4. Functional configuration example of information processing device
 1.5. Operational example
2. Conclusion <1. Embodiment According to the Present Disclosure>
[1.1. Appearance Example of Imaging Device]

Figure 2:
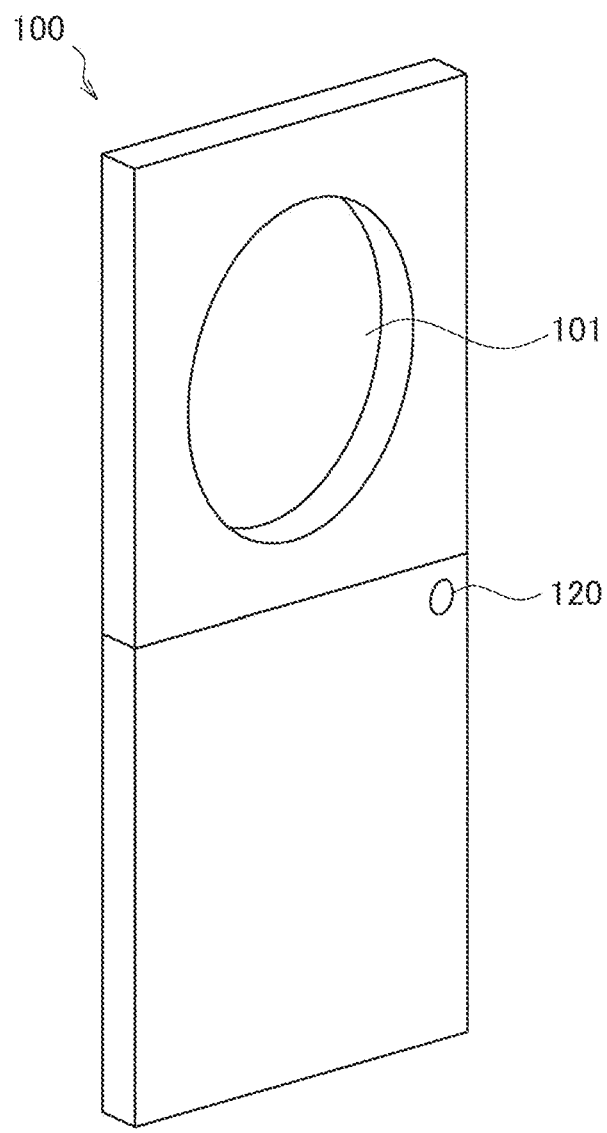
FIG. 2 is an explanatory diagram illustrating an appearance example of the imaging device 100 according to the embodiment.

First, a description will be given of an appearance example of an imaging device according to an embodiment of the present disclosure. FIGS. 1 and 2 are explanatory diagrams illustrating appearance examples of an imaging device 100 according to the embodiment of the present disclosure.

FIG. 1 is a front perspective view of the imaging device 100 according to the embodiment of the present disclosure. Further, FIG. 2 is a rear perspective view of the imaging device 100 according to the embodiment of the present disclosure. The imaging device 100 includes an imaging unit 110 that captures an image (still image or moving image) as an example of content of the present disclosure on the front side, and also includes an eye touch detecting unit 120 that detects a fact that an imaging person peers into a hole 101 on the rear side.

The eye touch detecting unit 120 includes, e.g., a camera, an infrared sensor, or the like. In a case where a camera is used as the eye touch detecting unit 120, the eye touch detecting unit 120 can detect not only eye touch to the hole 101 of the imaging person but also an operation of an eyeball in a case where the imaging person touches the eye to the hole 101. Although not shown in FIGS. 1 and 2, the imaging device 100 may have a microphone for collecting sound at the same time of an imaging time of a moving image with the imaging unit 110.

The imaging device 100 may include therein at least one of various sensors such as a position measurement sensor, an acceleration sensor, a gyroscope sensor, a geomagnetic sensor, an illuminance sensor, a temperature sensor, an air pressure sensor, and a heartbeat sensor. It is noted that as the above-mentioned position measurement sensor, specifically, e.g., a global navigation satellite system (GNSS) receiver and/or a communication device can be included. The GNSS can include, e.g., a global positioning system (GPS), a global navigation satellite system (GLONASS), a BeiDou navigation satellite system (BDS), a quasi-zenith satellites system (QZSS), a Galileo, or the like. Further, the position measurement sensor can include, e.g., a device for detecting a position using a technology such as wireless LAN, multi-input multi-output (MIMO), cellar communication (e.g., position detection using a mobile base station and a femtocell), or near field wireless communication (e.g., Bluetooth low energy (BLE), Bluetooth (registered trademark)).

It is noted that above-mentioned various sensors may not be provided to the imaging device 100. That is, the above-mentioned various sensors may be attached to the body of the imaging person who captures an image by using the imaging device 100.

Obviously, the imaging device 100 illustrated in FIGS. 1 and 2 is an example of the present disclosure, and the structure of the imaging device is not limited to the example. As long as the device can detect the touch to the eye of the imaging person and start the imaging, the hole 101 illustrated in FIGS. 1 and 2 may not be provided to the imaging device.

[1.2. Use Example of Imaging device]

Figure 3:
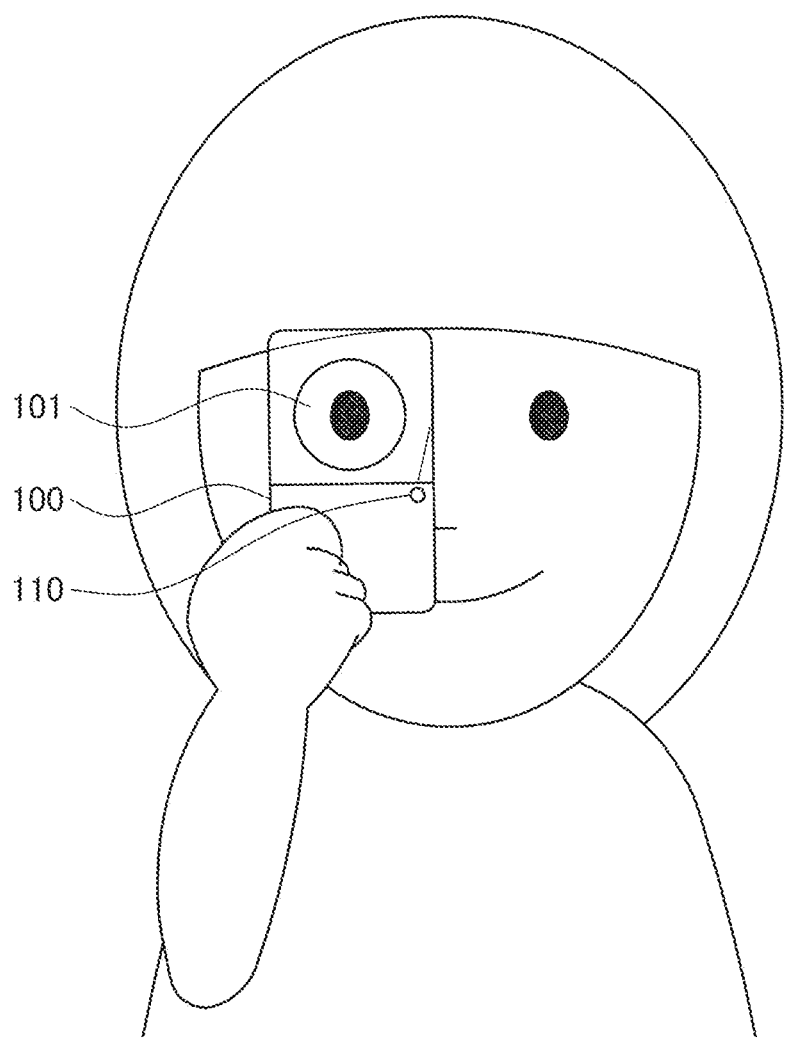
FIG. 3 is an explanatory diagram illustrating a use example of the imaging device 100 according to the embodiment.
Figure 4:
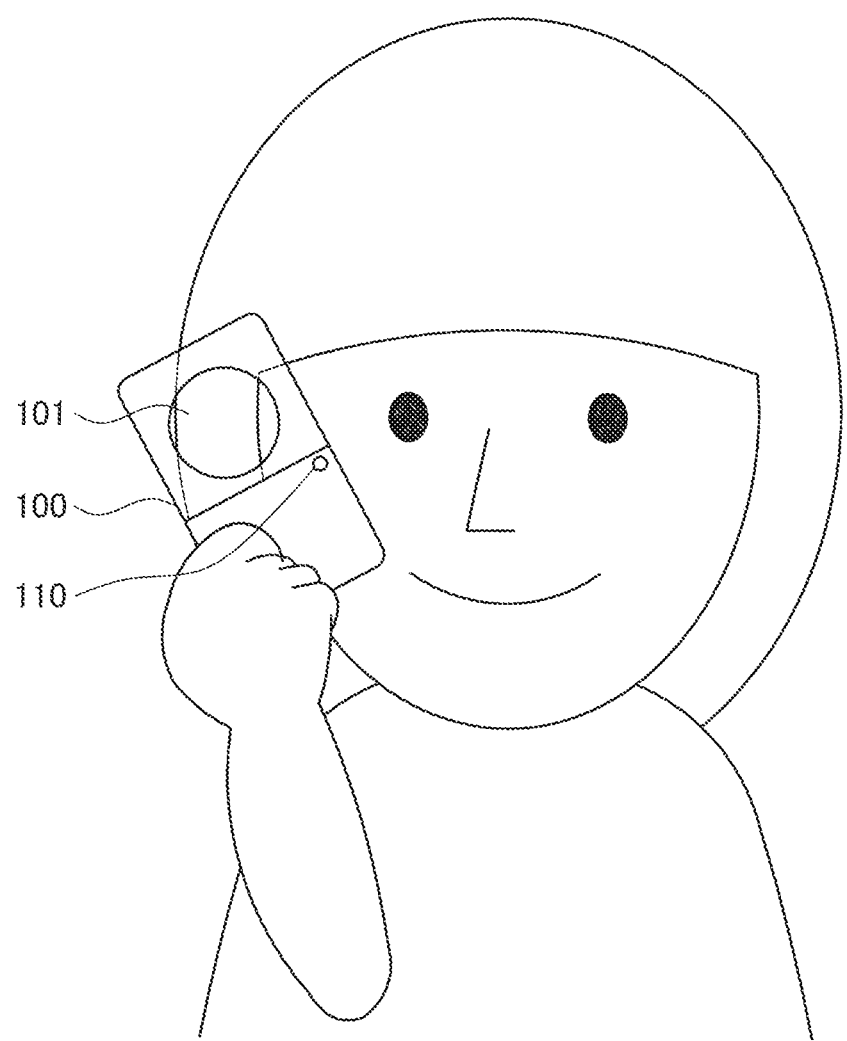
FIG. 4 is an explanatory diagram illustrating a use example of the imaging device 100 according to the embodiment.

Subsequently, a description will be given of a use example of the imaging device according to the embodiment of the present disclosure. FIGS. 3 and 4 are explanatory diagrams illustrating use examples of the imaging device 100 according to the embodiment of the present disclosure.

As illustrated in FIG. 3, the imaging device 100 according to the embodiment starts the imaging of a moving image with the imaging unit 110 in a case where the imaging person peers into the hole 101. Further, as illustrated in FIG. 4, the imaging device 100 according to the embodiment starts the imaging of the moving image with the imaging unit 110 in a case where the imaging person detaches the eye from the hole 101.

The eye touch detecting unit 120 detects whether or not the imaging person peers into the hole 101. In a case where the eye touch detecting unit 120 detects that the imaging person peers into the hole 101, the imaging device 100 starts the imaging of the moving image with the imaging unit 110. Further, in a case where the eye touch detecting unit 120 detects that the imaging person does not peer into the hole 101, the imaging device 100 ends the imaging of the moving image with the imaging unit 110.

The imaging device 100 stores therein the moving image captured for a period from the start of imaging to the end. The imaging device 100 may store data including sound collected during the period in a case of storing the moving image. Further, the imaging device 100 may store sensing data obtained by the sensor during the period or an eye touch state of the imaging person with the eye touch detecting unit 120 in the case of storing the moving image.

The imaging device 100 has a configuration that enables transfer of the stored moving image to another device, e.g., a personal computer, a smartphone, and a tablet terminal. The imaging device 100 may transfer the stored moving image to another device by using, e.g., near field communication (NFC).

Figure 5:
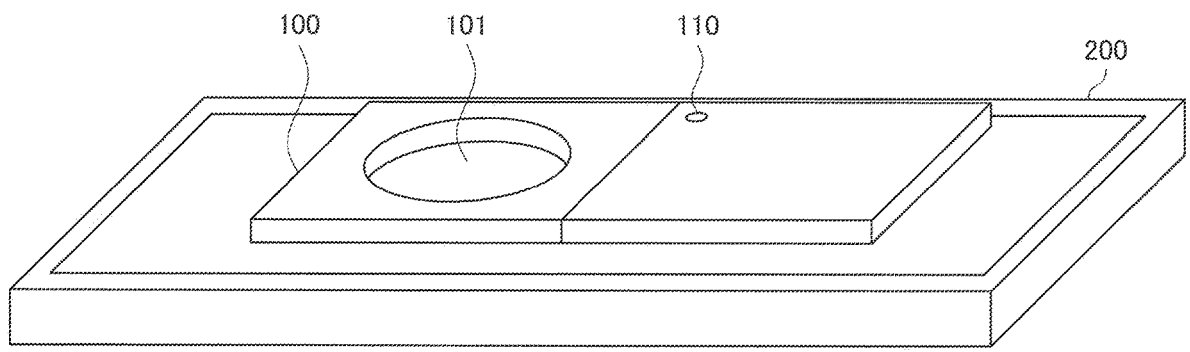
FIG. 5 is an explanatory diagram illustrating a state of transferring a moving image stored by the imaging device 100 to a mobile terminal 200.

FIG. 5 is an explanatory diagram illustrating a state that the moving image stored by the imaging device 100 is transferred to the mobile terminal 200. FIG. 5 illustrates an example of a state that the moving image stored by the imaging device 100 is transferred to the mobile terminal 200 with the NFC. As illustrated in FIG. 5, the imaging device 100 can be near the mobile terminal 200 and transfer the stored moving image to the mobile terminal 200 with the NFC.

Obviously, communication between the imaging device 100 and the mobile terminal 200 is not limited to the NFC.

Wireless communication using 2.4 GHz band based on, e.g., IEEE 802.15.1 standard may be used for the communication between the imaging device 100 and the mobile terminal 200, wireless communication using 2.4 GHz band or 5 GHz band via an access point of the wireless LAN may be used, or wired communication using a universal serial bus (USB) may be used.

It is noted that the imaging device 100 may transfer sensing data obtained by the sensor that is provided for the imaging device 100 for a period from the start of the imaging of the moving image to the end or is attached to the imaging person, or an eye touch state of the imaging person with the eye touch detecting unit 120, in a case where the moving image is transferred to the mobile terminal 200. The mobile terminal 200 obtains the sensing data and the eye touch state of the imaging person with the eye touch detecting unit 120 in addition to the moving image from the imaging device 100, thereby enabling setting of an effect on the obtained moving image by using the sensing data or the eye touch state.

Figure 6:
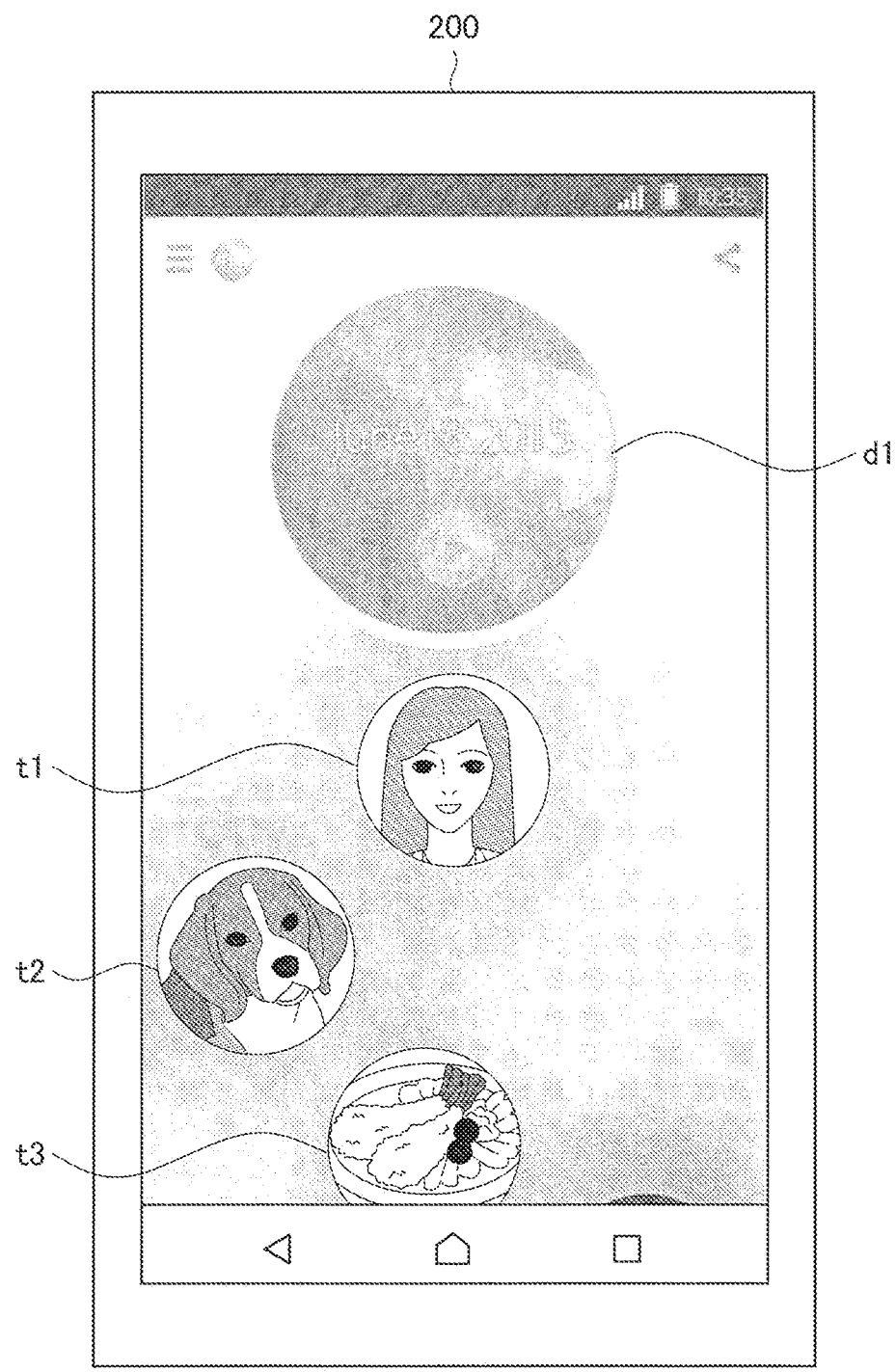
FIG. 6 is an explanatory diagram illustrating a screen example displayed by the mobile terminal 200.

FIG. 6 is an explanatory diagram illustrating an example of a screen displayed by the mobile terminal 200. FIG. 6 illustrates a screen displayed by the mobile terminal 200, an example of the screen that the mobile terminal 200 displays thumbnails t1, t2, and t3 as information representing individual moving images obtained from the imaging device 100 and an icon d1 added with information about date when the moving image is captured. The screen illustrated in FIG. 6 is displayed in a case where the user starts, e.g., application for reproducing the image captured by the imaging device 100 with the mobile terminal 200.

On the mobile terminal 200, the screen illustrated in FIG. 6 is touched by a finger or the like of the user, or the finger or the like is allowed to come near the screen, thereby enabling an operation of the user. It is noted that, hereinafter, the operation for touching the screen by a finger or the like of the user or allowing the finger or the like to come near the screen, will be collectively described as "allow the user to touch the screen by the finger or the like", "touch the screen by the finger or the like of the user", and the like.

For example, in a case where the user touches any of the thumbnails t1, t2, and t3 by the finger or the like, the mobile terminal 200 reproduces the moving image corresponding to the thumbnails, depending on the touch. Further, for example, the user touches the icon d1 by the finger or the like, and the mobile terminal 200 continuously reproduces the moving image captured at corresponding date, depending on the touch.

In a case of reproducing the moving image obtained from the imaging device 100, the mobile terminal 200 reproduces the moving image while adding an effect that the imaging person seems to peer into the hole 101.

Figure 7:
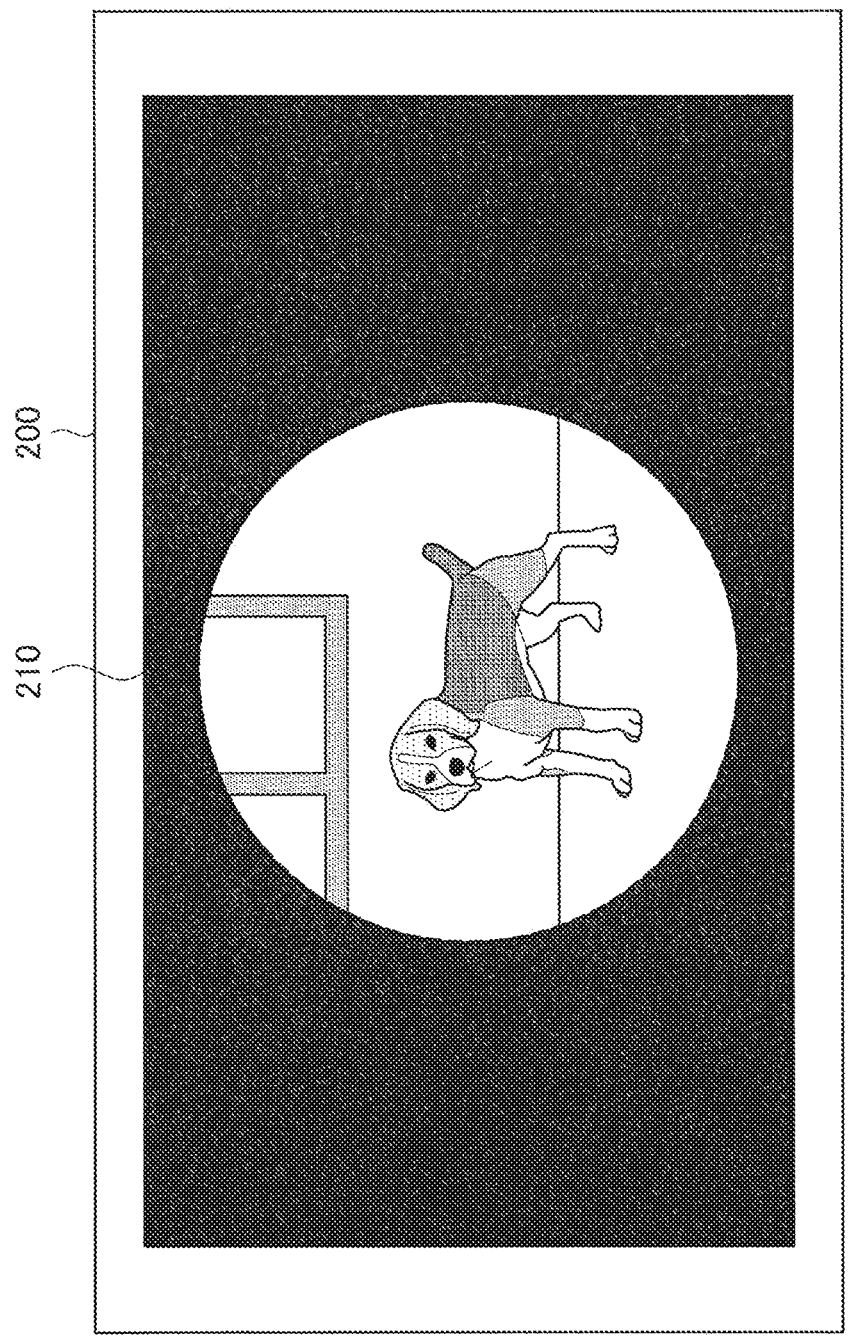
FIG. 7 is an explanatory diagram illustrating a screen example displayed by the mobile terminal 200 according to the embodiment.

FIG. 7 is an explanatory diagram illustrating the screen displayed by the mobile terminal 200 according to the embodiment of the present disclosure. FIG. 7 illustrates an example of the screen displayed by the mobile terminal 200 in a case of reproducing the moving image obtained from the imaging device 100.

FIG. 7 illustrates a state in which the moving image added with the effect that the imaging person seems to peer into the hole 101 is reproduced by the mobile terminal 200. The effect that the imaging person seems to peer into the hole 101 is given, thereby enabling reproduction with the mobile terminal 200 of the moving image similar to a field-of-view of the imaging person who captures an image by using the imaging device 100.

The mobile terminal 200 may change the effect given to the moving image by using the sensing data or the eye touch state of the imaging person obtained from the imaging device 100. The mobile terminal 200 can detect a concentrating state to the subject of the imaging person of the moving image by using the sensing data or the eye touch state of the imaging person. It is noted that the concentrating state means a state of increase in interest or the like of the imaging person to the captured subject.

That is, the mobile terminal 200 can change the effect given to the moving image, depending on the concentrating state of the imaging person. The effect given to the moving image is changed depending on the concentrating state of the imaging person, and the mobile terminal 200 can more visibly present where the imaging person concentrates on the subject (concentrating interval) to the moving image to a viewer of the moving image. The effect given on the moving image by the mobile terminal 200 will be specifically described with an example later.

[1.3. Functional Configuration Example of Imaging Device]

Figure 8:
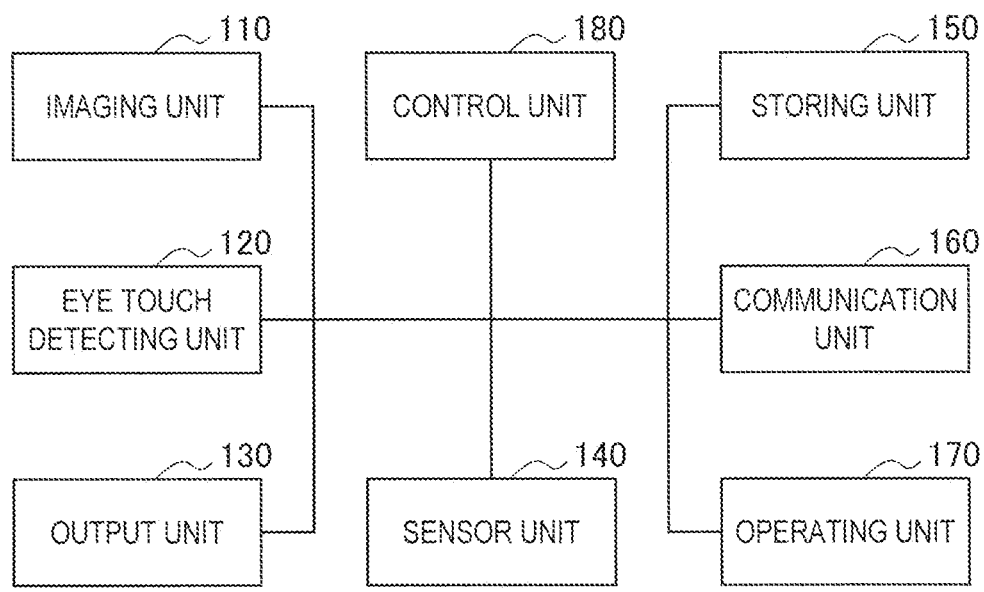
FIG. 8 is an explanatory diagram illustrating a functional configuration example of the imaging device 100 according to the embodiment.

Subsequently, a description will be given of a functional configuration example of the imaging device according to the embodiment of the present disclosure. FIG. 8 is an explanatory diagram illustrating a functional configuration example of the imaging device 100 according to the embodiment of the present disclosure. Hereinbelow, a description will be given of the functional configuration example of the imaging device 100 according to the embodiment of the present disclosure with reference to FIG. 8.

As illustrated in FIG. 8, the imaging device 100 according to the embodiment of the present disclosure includes the imaging unit 110, the eye touch detecting unit 120, an output unit 130, a sensor unit 140, a storing unit 150, a communication unit 160, an operating unit 170, and a control unit 180.

The imaging unit 110 is a camera module that captures an image, including a focusing lens, an imaging element, an A/D converter, and the like. The imaging unit 110 captures an image of real space by using an imaging element such as a charge coupled device (CCD) or a complementary metal oxide semiconductor (CMOS) to generate a captured image. A series of captured images generated by the imaging unit 110 form a video image displaying the real space. It is noted that the imaging device 100 may include a microphone that collects sound at the same time of the imaging of the moving image with the imaging unit 110.

The eye touch detecting unit 120 detects the eye touch to the hole 101 of the imaging person. The eye touch detecting unit 120 includes, e.g., a camera, an infrared sensor, and the like. By using the camera as the eye touch detecting unit 120, in addition to the eye touch to the hole 101 of the imaging person, the eye touch detecting unit 120 can detect an operation of an eyeball in a case of the eye touch to the hole 101 of the imaging person.

The output unit 130 outputs a state of the imaging device 100. The output unit 130 can include, e.g., a light emitting diode (LED), a speaker, and the like. The state of the imaging device 100 that is output by the output unit 130 includes, e.g., an on/off mode of a power source of the imaging device 100, a mode of the remaining amount of battery (not illustrated), and the like.

The sensor unit 140 obtains a state of the imaging device 100 and a state of the imaging person who captures the moving image by using the imaging device 100. As the sensor unit 140, it is possible to select at least one of various sensors such as the position measurement sensor, acceleration sensor, gyroscope sensor, geomagnetic sensor, illuminance sensor, temperature sensor, air pressure sensor, and heartbeat sensor.

The storing unit 150 includes, e.g., a storage medium such as a semiconductor memory, and stores a program and data for processing with the imaging device 100. Data stored by the storing unit 150 can include, e.g., the moving image captured by the imaging unit 110, sensor data output by the sensor unit 140, and data of the eye touch state of the imaging person detected by the eye touch detecting unit 120.

Further, the storing unit 150 may store information as a determining material about whether or not the image is the moving image captured by the imaging device 100 in the mobile terminal 200, as well as the moving image captured by the imaging unit 110. The information may be, e.g., a flag indicating the moving image captured by the imaging device 100 or information of a device name of the imaging device 100.

The communication unit 160 is a communication interface that intermediates communication with another device by using the imaging device 100. The communication unit 160 supports an arbitrary wireless communication protocol or wired communication protocol to establish communication connection with another device. For example, as mentioned above, the communication unit 160 may have an antenna coil for communication with the mobile terminal 200 by using the NFC.

The operating unit 170 is an input device used for operating the imaging device 100. The operating unit 170 can include, e.g., a button for switching on/off the power source.

The control unit 180 corresponds to a processor such as a central processing unit (CPU) or a digital signal processor (DSP). The control unit 180 executes a program stored in the storing unit 150, and the eye touch detecting unit 120 detects that, for example, the eye touch to the hole 101 of the imaging person. Subsequently, the imaging of the moving image with the imaging unit 110 starts. The eye touch detecting unit 120 does not detect the eye touch to the hole 101 of the imaging person and the imaging of the moving image with the imaging unit 110 can end.

The control unit 180 allows the moving image captured by the imaging unit 110 to be stored in the storing unit 150. Further, the control unit 180 allows the sensing data output by the sensor unit 140 for a period to capture the moving image by the imaging unit 110 to be stored in the storing unit 150.

The above-mentioned imaging unit 110, eye touch detecting unit 120, output unit 130, sensor unit 140, storing unit 150, communication unit 160, operating unit 170, and control unit 180 are connected to each other by a bus in the imaging device 100.

The imaging device 100 has the configuration illustrated in FIG. 8, and thus the imaging of the moving image starts, corresponding to the eye touch to the hole 101 of the imaging person, and the moving image can be stored in the storing unit 150.

It is inevitable that there is a difference depending on users in an image actually viewed through the hole 101 of the imaging device 100, due to the difference in right and left dominant eyes and a habit for holding the imaging device 100. Therefore, even with image processing to the image captured by the imaging unit 110, there might be a problem in accuracy or precision. Therefore, the imaging device 100 may execute calibration or a test function at the initial setting time. The imaging device 100 executes the calibration or the test function at the initial setting time, thereby enabling reduction in factors that cause the above-mentioned differences such as the holding habit of each user.

The above description is given of the functional configuration example of the imaging device 100 according to the embodiment of the present disclosure with reference to FIG. 8. Subsequently, a description will be given of a functional configuration example of the mobile terminal 200 according to the embodiment of the present disclosure.

[1.4. Functional Configuration Example of Mobile Terminal]

Figure 9:
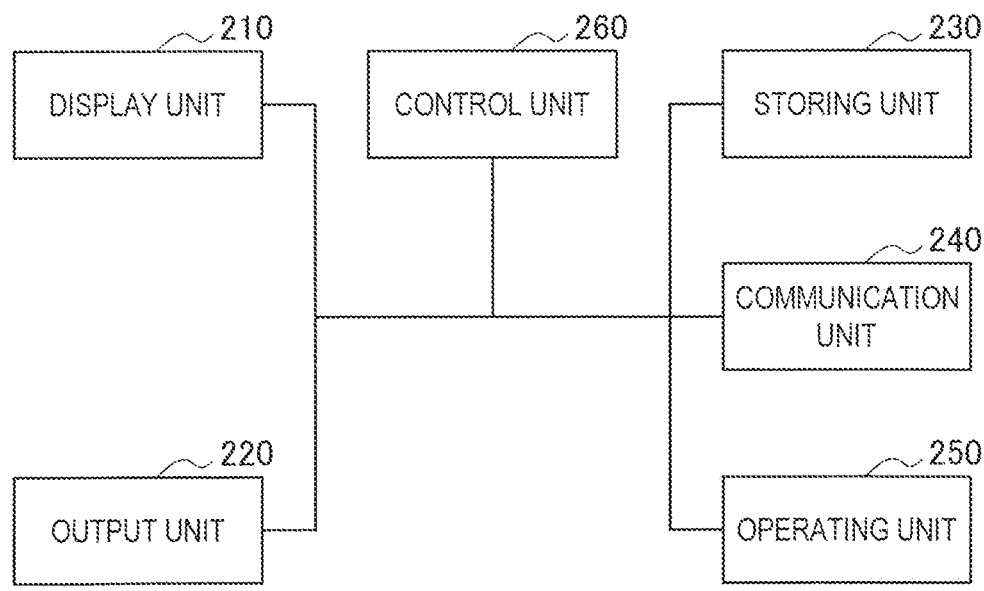
FIG. 9 is an explanatory diagram showing a functional configuration example of the mobile terminal 200 according to the embodiment.

FIG. 9 is an explanatory diagram illustrating a functional configuration example of the mobile terminal 200 according to the embodiment of the present disclosure. Hereinbelow, a description will be given of the functional configuration example of the mobile terminal 200 according to the embodiment of the present disclosure with reference to FIG. 9.

As illustrated in FIG. 9, the mobile terminal 200 according to the embodiment of the present disclosure includes a display unit 210, an output unit 220, a storing unit 230, a communication unit 240, an operating unit 250, and a control unit 260.

The display unit 210 displays a character, an image, and other information on the basis of control of the control unit 260. The display unit 210 is a display module including a display such as an LCD or OLED. The display unit 210 is used to display, e.g., the moving image captured by the imaging device 100. It is noted that the display unit 210 may not necessarily be a part of the mobile terminal 200. For example, a display device connected to the mobile terminal 200 by a wired or wireless manner may be used as the display unit 210. Also, for example, in addition to the function for displaying the information on the mobile terminal 200 itself, or in place of the function for displaying the information on the mobile terminal 200 itself, e.g., a function for projecting the information on a wall may be included.

The output unit 220 outputs sound or light on the basis of control of the control unit 260. The output unit 220 can include a device such as a speaker or an LED.

The storing unit 230 includes, e.g., a storage medium such as a semiconductor memory, and stores a program and data for processing with the mobile terminal 200. Data stored in the storing unit 230 can include, e.g., the moving image captured by the imaging device 100, the sensor data, or the data of the eye touch state of the imaging person, obtained from the imaging device 100.

The communication unit 240 is a communication interface that intermediates communication with another device by the mobile terminal 200. The communication unit 240 supports an arbitrary wireless communication protocol or wired communication protocol to establish the communication connection with another device. For example, as mentioned above, the communication unit 240 may have an antenna coil for communication with the imaging device 100 by using the NFC.

The operating unit 250 is an input device used for operating the mobile terminal 200 by the user or inputting the information to the mobile terminal 200. The operating unit 250 may include a touch sensor for detecting the touch of the user onto, e.g., a screen of the display unit 210. Preferably, the touch sensor can detect the touch of two or more points. However, the device is not limited to that detectable of the touch of two or more points. In place of the device (or in addition to that), the operating unit 250 may include a pointing device such as a mouse or a touch pad.

Further, the operating unit 250 may include another kind of input devices, such as a keyboard, a keypad, a button, or a switch.

The control unit 260 corresponds to a processor such as a CPU or a DSP. The control unit 260 executes a program stored in the storing unit 230, thus gives various effects on the moving image captured by the imaging device 100, and allows the display unit 210 to display the image. For example, in the case of outputting the moving image captured by the imaging device 100, the control unit 260 allows the display unit 210 to display the moving image that has been given the effect like peering into the hole 101 by the imaging person, as illustrated in FIG. 7. By giving the effect like peering into the hole 101 by the imaging person, the control unit 260 enables the display unit 210 to display the moving image similar to the field-of-view of the imaging person.

Further, the control unit 260 may change the effect given on the moving image by using the sensing data or the eye touch state of the imaging person obtained from the imaging device 100. The control unit 260 can detect the concentrating state to the subject in the moving image by the imaging person by using the sensing data or the eye touch state of the imaging person. Further, the control unit 260 may change the effect given on the moving image depending on the change of the concentrating state to the subject.

For example, an interval corresponding to an interval when the motion of line-of-sight of the imaging person reaches a predetermined value or less is set as a concentrating interval. At the concentrating interval, the control unit 260 may change the effect given on the moving image from an interval (non-concentrating interval) other than the concentrating interval. Although an example will be described later, the control unit 260 may reproduce the moving image, for example, at fast feed (e.g., speed that is two or three times of normal one) at the non-concentrating interval, and reproduce the moving image at a normal speed at the concentrating interval.

It is noted that in the control unit 260, the moving image that gives the effect that the imaging person seems to peer into the hole 101 as illustrated in FIG. 7 may be limited to the image captured by the imaging device 100 having the hole 101. However, the present disclosure is not limited to this. The control unit 260 may determine whether or not the image is the moving image captured by the imaging device 100 having the hole 101 by determination about whether or not there is the eye touch state to the imaging device 100 of the imaging person. Alternatively, the control unit 260 may determine whether or not a flag indicating the moving image captured by the imaging device 100 having the hole 101 is set. Further, the control unit 260 may determine whether or not the image is the moving image captured by the imaging device 100 having the hole 101 by using information about a device type.

Further, the control unit 260 displays a thumbnail image of the moving image obtained from the imaging device 100 or a list screen for displaying a folder where a plurality of the moving images are stored on the display unit 210.

The mobile terminal 200 according to the embodiment of the present disclosure has the configuration and, thus, can display the moving image having been given the effect that the imaging person seems to peer into the hole 101, detect the concentrating state of the imaging person and change the effect given on the moving image depending on the change of the concentrating state.

The above description is given of the functional configuration example of the mobile terminal 200 according to the embodiment of the present disclosure. Subsequently, a description will be given of an operating example of the mobile terminal 200 according to the embodiment of the present disclosure.

[1.5. Operational Example of Mobile Terminal]

Figure 10:
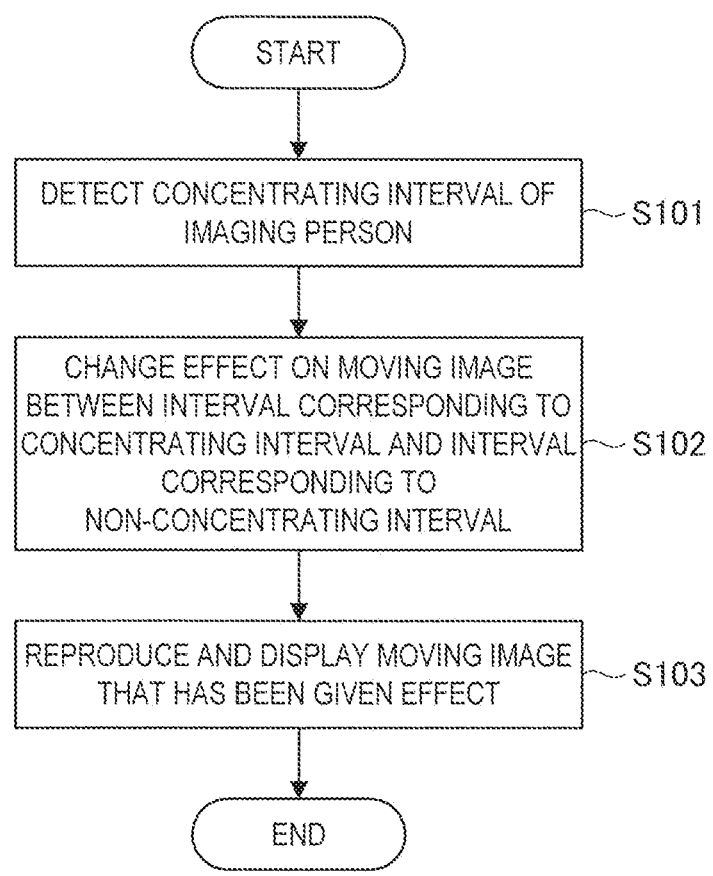
FIG. 10 is a flowchart illustrating an operational example of the mobile terminal 200 according to the embodiment.

FIG. 10 is a flowchart illustrating an operating example of the mobile terminal 200 according to the embodiment of the present disclosure. FIG. 10 illustrates the operational example of the mobile terminal 200 in a case of reproducing the moving image captured by the imaging device 100 and allowing the reproduced image to be displayed on the display unit 210. Hereinbelow, a description will be given of the operational example of the mobile terminal 200 according to the embodiment of the present disclosure with reference to FIG. 10.

In the case of reproducing the moving image captured by the imaging device 100, the mobile terminal 200 first detects the concentrating interval of the imaging person who captures the moving image (step S101). The detection of the concentrating interval of the imaging person in step S101 is executed by, e.g., the control unit 260. It is noted that the detection of the concentrating interval in step S101 may be performed prior to the reproduction of the moving image, or be performed at timing for starting the reproduction of the moving image.

After detecting the concentrating interval of the imaging person who captures the moving image to be reproduced in the step S101, subsequently, the mobile terminal 200 changes the effect on the moving image to be reproduced between the concentrating interval detected in the step S101 and the non-concentrating interval except for the concentrating interval (step S102). The change of the effect on the moving image to be reproduced in step S102 is executed by, e.g., the control unit 260.

The effect on the moving image to be reproduced is changed between the concentrating interval and the non-concentrating interval except for the concentrating interval in the step S102. Subsequently, the mobile terminal 200 reproduces the moving image having been given the effect and displays the image on the display unit 210 (step S103).

Herein, an example will be given of the effect given on the moving image that is reproduced by the mobile terminal 200. Obviously, the following description illustrates an example of the effect given on the moving image reproduced by the mobile terminal 200 and the effect is not all effects on content according to the present disclosure.

Figure 11:
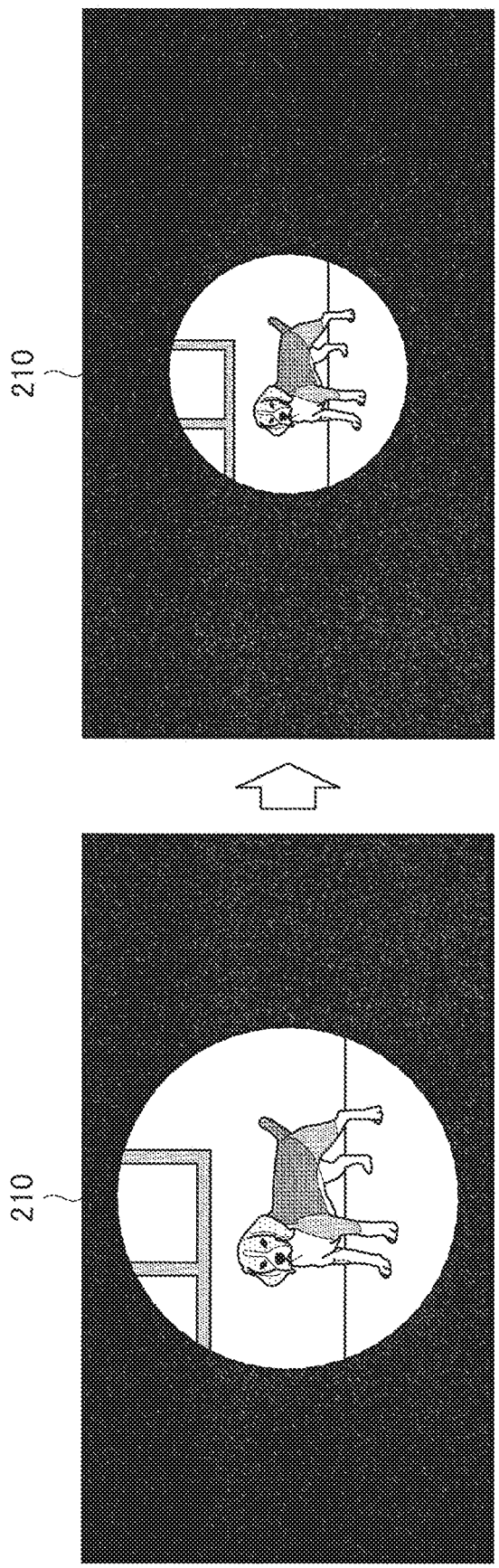
FIG. 11 is an explanatory diagram illustrating an example of an effect given on a moving image reproduced by the mobile terminal 200.

FIG. 11 is an explanatory diagram illustrating an example of the effect given on the moving image reproduced by the mobile terminal 200. The left in FIG. 11 illustrates the effect given on the moving image reproduced by the mobile terminal 200 at the non-concentrating interval. The right illustrates the effect given on the moving image reproduced by the mobile terminal 200 at the concentrating interval.

In the example in FIG. 11, at the non-concentrating interval, the mobile terminal 200 gives the effect that the imaging person seems to peer into the hole 101, as mentioned above. That is, the mobile terminal 200 displays the moving image only in the central part of the display unit 210, and other parts are shaded. On the other hand, at the concentrating interval, the mobile terminal 200 gives an effect that the imaging person seems to concentrate on the subject by narrowing a range for displaying the moving image. That is, the mobile terminal 200 widens a shading range from the non-concentrating interval at the concentrating interval.

As illustrated in FIG. 11, the range for displaying the moving image is changed between the concentrating interval and the non-concentrating interval. Thus, the mobile terminal 200 can more visibly present at which interval the imaging person sees and concentrates on the subject. That is, the mobile terminal 200 can change the effect given on the moving image depending on the concentrating level of the imaging person.

Figure 12:
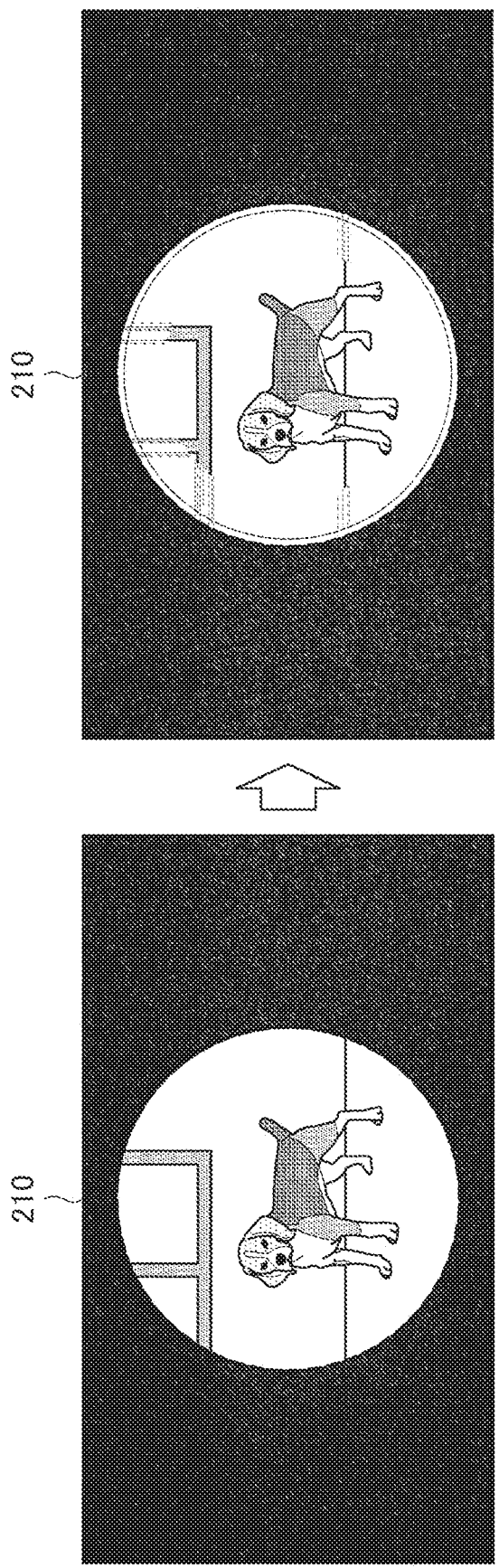
FIG. 12 is an explanatory diagram illustrating an example of an effect given on a moving image reproduced by the mobile terminal 200.

FIG. 12 is an explanatory diagram illustrating an example of the effect given on the moving image reproduced by the mobile terminal 200. The left in FIG. 12 illustrates the effect given on the moving image reproduced by the mobile terminal 200 at the non-concentrating interval. The right illustrates the effect given on the moving image reproduced by the mobile terminal 200 at the concentrating interval.

In the example in FIG. 12, at the non-concentrating interval, the mobile terminal 200 gives the effect that the imaging person seems to peer into the hole 101, as mentioned above. That is, the mobile terminal 200 displays the moving image only in the central part of the display unit 210, and another part is shaded. On the other hand, at the concentrating interval, the mobile terminal 200 does not change the range for displaying the moving image, however gives an effect that a boundary with the shaded part is blurred and the imaging person concentrates on the subject.

As illustrated in FIG. 12, the display of the boundary between the display area of the moving image and the shaded area is changed between the concentrating interval and the non-concentrating interval. As a consequence, the mobile terminal 200 can more visibly present at which interval, the imaging person sees and concentrates on the subject.

FIG. 13 is an explanatory diagram illustrating an example of the effect given on the moving image reproduced by the mobile terminal 200. The left in FIG. 13 illustrates the effect given on the moving image reproduced by the mobile terminal 200 at the non-concentrating interval. The right illustrates the effect given on the moving image reproduced by the mobile terminal 200 at the concentrating interval.

In the example in FIG. 13, at the non-concentrating interval, the mobile terminal 200 gives the effect that the imaging person seems to peer into the hole 101, as mentioned above. That is, the mobile terminal 200 displays the moving image only at the central part of the display unit 210, and another part is shaded. Further, at the non-concentrating interval, the mobile terminal 200 displays the moving image in monochrome. On the other hand, at the concentrating interval, the mobile terminal 200 does not change the range for displaying the moving image, however, displays the moving image in color, that is, an image in a captured state.

As illustrated in FIG. 13, by changing a display format of the display area of the moving image between the concentrating interval and the non-concentrating interval, the mobile terminal 200 can more visibly present at which interval the imaging person sees and concentrates on the subject.

FIG. 14 is an explanatory diagram illustrating an example of the effect given on the moving image reproduced by the mobile terminal 200. The left in FIG. 14 illustrates the effect given to the moving image reproduced by the mobile terminal 200 at the non-concentrating interval, and the right illustrates the effect given on the moving image reproduced by the mobile terminal 200 at the concentrating interval.

In the example in FIG. 14, at the non-concentrating interval, the mobile terminal 200 gives the effect that the imaging person seems to peer into the hole 101, as mentioned above. That is, the mobile terminal 200 displays the moving image only at the central part of the display unit 210, and another part is shaded. Further, at the non-concentrating interval, the mobile terminal 200 displays the moving image as with illustration. On the other hand, at the concentrating interval, the mobile terminal 200 does not change the range for displaying the moving image, however, displays the moving image as an actual video image, i.e., in a captured state.

As illustrated in FIG. 14, a display format of the display area of the moving image is changed between the concentrating interval and the non-concentrating interval. Thus, the mobile terminal 200 can more visibly present at which interval the imaging person sees and concentrates on the subject.

Figure 15:
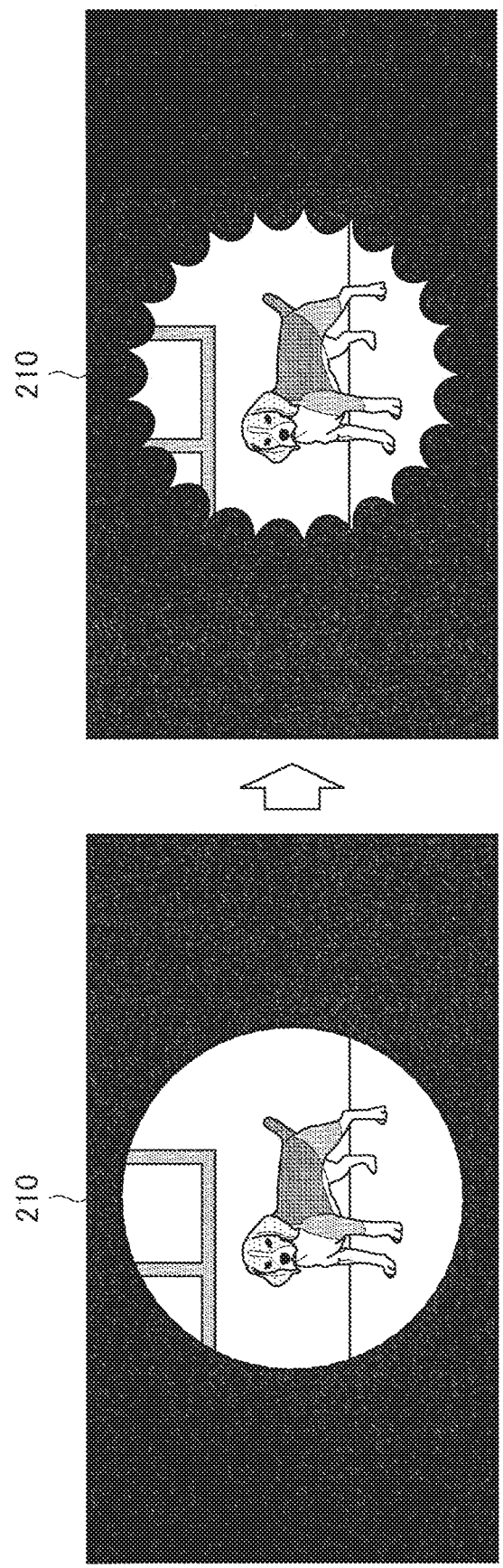
FIG. 15 is an explanatory diagram illustrating an example of an effect given on a moving image reproduced by the mobile terminal 200.

FIG. 15 is an explanatory diagram illustrating an example of the effect given on the moving image reproduced by the mobile terminal 200. The left in FIG. 15 illustrates the effect given on the moving image reproduced by the mobile terminal 200 at the non-concentrating interval, and the right illustrates the effect given on the moving image reproduced by the mobile terminal 200 at the concentrating interval.

In the example in FIG. 15, at the non-concentrating interval, as mentioned above, the mobile terminal 200 gives the effect that the imaging person seems to peer into the hole 101. That is, the mobile terminal 200 displays the moving image only at the central part of the display unit 210, and another part is shaded. On the other hand, at the concentrating interval, the mobile terminal 200 changes the shape of the range for displaying the moving image. In the example in FIG. 15, the shape of the range for displaying the moving image is not exact circle, but as with notches on circle.

As illustrated in FIG. 15, a display format of the display area of the moving image is changed between the concentrating interval and the non-concentrating interval. Thus, the mobile terminal 200 can more visibly present at which interval, the imaging person sees and concentrates on the subject.

It is noted that in the example illustrated in FIG. 15, in a case of emotion of the imaging person or the subject as a person at the concentrating interval, the mobile terminal 200 may change the shape of the range for displaying the moving image depending on the emotion of the subject. For example, it is assumed the imaging person is relaxed in a case where the imaging person captures an image of a cat by using the imaging device 100. The mobile terminal 200 may set the shape of the range for displaying the moving image as shape meaning relaxed emotion such as heart shape at the concentrating interval. The mobile terminal 200 may determine the emotion of the imaging person on the basis of, for example, the sensing data obtained by the sensor unit 140. Further, it is assumed that, in the case of capturing an image of the person and the person smiles, the mobile terminal 200 may set the shape of the range for displaying the moving image as shape meaning relaxed emotion such as heart shape at the concentrating interval. The mobile terminal 200 can know whether or not the person smiles by analyzing the moving image.

The mobile terminal 200 may give the effect that the imaging person seems to peer into the hole 101, for example, at the non-concentrating interval in addition to the above-mentioned effect, and fast-feed and reproduce the moving image. At the concentrating interval, similarly, the mobile terminal 200 may give the effect that the imaging person seems to peer into the hole 101, and reproduce the moving image at an equal speed. For example, at the non-concentrating interval, the mobile terminal 200 gives the effect that the imaging person seems to peer into the hole 101 and reproduces the moving image, however, regarding sound, may play not-sound of the moving image, but another sound, i.e., background music (BGM). For example, at the concentrating interval, the mobile terminal 200 may give the effect that the imaging person seems to peer into the hole 101, reproduce the moving image, regarding sound, also reproduce the sound of the moving image.

It is noted that the mobile terminal 200 may exclusively apply the above-mentioned effects, and apply combination of a plurality of the effects.

The mobile terminal 200 may determine which effect is applied from the above-mentioned effects on the basis of a condition of an imaging target, a condition of imaging environment, a condition of the imaging person, or the like. Further, in a case of determining the effect on the basis of the condition of the imaging target, the condition of the imaging environment, the condition of the imaging person, or the like, the mobile terminal 200 may set the individual conditions as scores and determine the effect on the basis of the scores.

FIGS. 16A and 16B illustrate explanatory diagrams illustrating examples of setting scores on the basis of the individual condition of the imaging target, condition of the imaging environment, and condition of the imaging person. Further, FIG. 17 is an explanatory diagram illustrating an example of a table for determining which effect the mobile terminal 200 applies in the above-mentioned effects.

A description will be given of a way of viewing the tables in FIGS. 16A and 16B. For example, in a case where the imaging target is macro (flower, object, meal, etc.), a score of an effect "reproducing speed changes" is set as one point and a score of another effect is set as two points. The tables in FIGS. 16A and 16B describe scores of the individual effects in the case where the imaging target is another landscape, night scene, a person, and a subject with large motion. Since there are a plurality of the imaging targets, for example, in a case where the imaging target of the moving image is a landscape or a person, a score of the effect "circle is smaller" is total four points.

The tables in FIGS. 16A and 16B additionally describe scores of the individual effects under the condition of the imaging environment and the condition of the imaging person.

The mobile terminal 200 calculates individual total values of the condition of the imaging target, the condition of the imaging environment, and the condition of the imaging person. If the total values satisfy the conditions of the individual effects in the table illustrated in FIG. 17, the effect is applied to the moving image. It is noted that, in a case where the individual condition of the imaging target, condition of the imaging environment, and condition of the imaging person are all satisfied, the mobile terminal 200 may apply the effect on the moving image.

For example, in the case where the imaging target of the moving image is a landscape or a person, regarding a score of an effect "circle is smaller", the total score of the effect is four points. Regarding a score of an effect "the surroundings of a focusing point are blurred", the total score is four points. Regarding a score of an effect "from monochrome to color", the total score of the effect is four points. Regarding a score of an effect "reproducing speed changes", the total score of the effect is one point. Regarding an effect "use picture effect", the total score of the effect is four points. Regarding an effect "shape of circle changes", the total score of the effect is four points. Regarding an effect "balance of BGM changes", the total score of the effect is three points. Here, referring to the table in FIG. 17, the total value of the condition of the imaging target satisfies the condition described in the table under the two conditions of the effect "circle is smaller" and the effect "the surroundings of the focusing point are blurred". Therefore, in the case where the imaging target of the moving image is a landscape or a person, the mobile terminal 200 first selects the effect "circle is smaller" or the effect "the surroundings of the focusing point are blurred".

Further, the mobile terminal 200 similarly calculates the scores of the condition of the imaging environment of the moving image and the condition of the imaging person at the imaging time and refers to the table in FIG. 17, thereby determining which effect is applied. It is noted that the table in FIG. 16A illustrates the score of the imaging target of the moving image. However, the present disclosure is not limited to the example. For example, the mobile terminal 200 may set scores of the individual moving images on the basis of content of the sound included in the moving image.

It is noted that, in a case where only one effect is not selected as a result of calculating the individual scores of the condition of the imaging target, the condition of the imaging environment, and the condition of the imaging person, the mobile terminal 200 may select the effect with the highest total score.

Obviously, in the case where only one effect is not selected as a result of calculating the individual scores of the condition of the imaging target, the condition of the imaging environment, and the condition of the imaging person, the mobile terminal 200 may apply all the effects, or select and apply a plurality of the effects with higher score.

The mobile terminal 200 may display an interface for inputting of right or wrong as a determination result on the display unit 210 in consideration of a case of determining the concentrating interval even in the case where the person actually does not concentrate.

Further, the mobile terminal 200 may set, for example, a threshold more strict for a time that the eyeball does not move with a predetermined value or longer or allow registration of a dominant eye at the initial setting of the imaging device 100, in consideration of the case of determining the concentrating interval even in the case that the person actually does not concentrate. Since there is a possibility to influence on the determination about the motion of the eyeball in a case where the imaging person who uses the imaging device 100 wears an eyeglass or a contact lens, the imaging device 100 may set the presence or absence of the eyeglass or the contact lens prior to the imaging.

In the case where the imaging device 100 detects a predetermined cancel operation at time of capturing the image or after the end of imaging, the imaging device 100 may erase the image captured just before and not store the image into the storing unit 150. As the predetermined cancel operation, for example, the imaging device 100 may be shaken, a button for erasure may be pressed, or the like.

In the case of determining the concentration, the control unit 260 may set a flag for seeing the concentrating interval, a bit before the time, e.g., before one second. The control unit 260 may change the return time, depending on the subject. The control unit 260 may prolong the return time in a case of, e.g., a subject with motion, and reduce the return time in a case of the subject without motion.

The control unit 260 may change the effect depending on a name of a reproducing target or resolution. For example, in a case where the reproducing target is TV, at the concentrating interval, the control unit 260 may give an effect for widening a shaded range from the non-concentrating interval, as illustrated in FIG. 11. For example, in a case where the reproducing target is a smartphone, at the concentrating interval, the control unit 260 may not give the effect because a viewing range is narrow by giving the effect for widening the shaded range from the non-concentrating interval.

<2. Conclusion>

As mentioned above, according to the embodiment of the present disclosure, the mobile terminal 200 is provided with the effect for enabling the display of the moving image with the given effect that the imaging person seems to peer into the hole 101 of the imaging device 100. Further, according to the embodiment of the present disclosure, the mobile terminal 200 is provided with the effect for deleting the concentrating state of the imaging person with the above-mentioned effect and enabling the change of the effect given to the moving image depending on the change of the concentrating state.

It may not be necessary to chronologically execute respective steps in the processing, which is executed by each device of this specification, in the order described in the sequence diagrams or the flow charts. For example, the respective steps in the processing which is executed by each device may be processed in the order different from the order described in the flow charts, and may also be processed in parallel.

Furthermore, it becomes possible to generate a computer program which makes a hardware device, such as a CPU, a ROM, and a RAM incorporated in each device demonstrate the functions equivalent to the configurations of the above described devices. In addition, it becomes also possible to provide a storage medium which stores the computer program. In addition, respective functional blocks shown in the functional block diagrams may be constituted from hardware devices or hardware circuits so that a series of processes may be implemented by the hardware devices or hardware circuits.

Further, a part or all of the individual functional blocks illustrated in the functional block diagrams used in the above description may be realized by a server device connected via a network such as the Internet. Furthermore, the configuration of the individual functional blocks illustrated in the functional block diagrams used in the above description may be realized by a single device, or may be realized by a system with cooperation of a plurality of devices. The system with the cooperation of a plurality of devices can include, e.g., combination of a plurality of server devices, combination of the server device and a terminal device, or the like.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the mobile terminal 200 may detect the concentrating state of the imaging person on the basis of biological information of the imaging person. The biological information includes information about, for example, heartbeat, body temperature, sweating, blood pressure, sweating, pulse, breathing, palpebration, eyeball motion, size of pupil diameter, brain waves, and the like.

For example, the mobile terminal 200 may detect the concentrating state of the imaging person on the basis of an action state of the imaging person. The action state can include, for example, a still state, a walking state, a running state, climbing up/down steps, driving of a bicycle, a vehicle, or another moving body, or the like.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A control device including:

a control unit that changes an effect on content between a first part where a concentrating state to the content of a creator of the content is detected in the content and a second part different from the first part.

(2)

The control device according to (1), in which the control unit changes the effect, depending on a degree of the concentrating state.

(3)

The control device according to (1) or (2), in which the control unit determines the effect, depending on a subject in the content.

(4)

The control device according to any one of (1) to (3), in which the control unit determines the effect, depending on a situation at time of generating the content.

(5)

The control device according to any one of (1) to (4), in which the control unit determines the effect, depending on a situation of the creator at time of generating the content.

(6)

The control device according to any one of (1) to (5), in which the control unit gives the content an effect of fast-feeding and displaying the content at the second part, and displaying the content at an equal speed at the first part.

(7)

The control device according to any one of (1) to (6), in which the control unit gives the content an effect of narrowing a display range of the content at the first part from the second part.

(8)

The control device according to any one of (1) to (7), in which the control unit gives the content an effect of blurring a periphery of a display range of the content at the first part.

(9)

The control device according to any one of (1) to (8), in which the control unit gives the content an effect of displaying the content in monochrome at the second part, and displaying the content in color at the first part.

(10)

The control device according to any one of (1) to (9), in which the control unit analyzes a matter of the content, and determines the effect.

(11)

The control device according to (10), in which the control unit analyzes an image included in the content, and determines the effect.

(12)

The control device according to (10) or (11), in which the control unit analyzes sound included in the content, and determines the effect.

(13)

The control device according to any one of (10) to (12), in which the control unit determines the effect on a basis of sensing data at time of generating the content.

(14)

The control device according to (10), in which the control unit determines the effect on a basis of at least one of a condition of a target of the content, a condition of environment where the content is generated, and a condition of a generator of the content.

(15)

The control device according to (14), in which the control unit determines the effect on a basis of a score of at least one of the condition of the target of the content, the condition of the environment where the content is generated, and the condition of the generator of the content.

(16)

The control device according to (1), in which the control unit determines the effect, depending on an output target of the content.

(17)

The information processing device according to any one of (1) to (16), in which the concentrating state is detected on a basis of biological information of the creator detected at timing corresponding to timing of generating the content.

(18)

The information processing device according to any one of (1) to (17), in which the concentrating state is detected on a basis of action information of the creator detected at timing corresponding to timing of generating the content.

(19)

A control method including:
detecting a concentrating state to content of a creator of the content in the content; and
changing an effect on the content between a first part where the concentrating state is detected and a second part different from the first part.

(20)

A computer program that causes a computer system to execute:
detecting a concentrating state to content of a creator of the content in the content; and
changing an effect on the content between a first part where the concentrating state is detected and a second part different from the first part.

REFERENCE SIGNS LIST 100 imaging device
101 hole
110 imaging unit
120 eye touch detecting unit
130 output unit
140 sensor unit
150 storing unit
160 communication unit
170 operating unit
180 control unit
200 mobile terminal
210 display unit
220 output unit
230 storing unit
240 communication unit
250 operating unit
260 control unit
d1 icon
t1 thumbnail
t2 thumbnail
t3 thumbnail

The invention claimed is:

1. A control device, comprising:
a control unit configured to:
control a display screen to display content on each of a first display part of the display screen and a second display part of the display screen;
acquire biological information of a creator of the content from a plurality of sensors including a camera, a temperature sensor, and a heartbeat sensor, wherein the acquired biological information corresponds to biological information of the creator at a time of generation of the content;
determine a concentrating state of the creator of the content based on the acquired biological information of the creator; and
change an effect on the content between the first display part and the second display part based on the determination of the concentrating state, wherein the second display part is different from the first display part.

2. The control device according to claim 1, wherein the control unit is further configured to change the effect based on a degree of the concentrating state.

3. The control device according to claim 1, wherein the control unit is further configured to determine the effect based on a subject in the content.

4. The control device according to claim 1, wherein
the control unit is further configured to determine the effect based on a situation at the time of the generation of the content, and
the situation is different from the biological information of the creator.

5. The control device according to claim 1, wherein
the control unit is further configured to determine the effect based on a situation of the creator at the time of the generation of the content, and
the situation of the creator is different from the biological information of the creator.

6. The control device according to claim 1, wherein the control unit is further configured to control the display screen to:
display a fast-feeding effect on the content on the second display part; and
display the content on the first display part at a speed different from that of the content on the second display part.

7. The control device according to claim 1, wherein the control unit is further configured to control the display screen to:
display the content in a first display range in the first display part; and
display the content in a second display range in the second display part, wherein the first display range is narrower than the second display range.

8. The control device according to claim 1, wherein the control unit is further configured to control the display screen to display a blurring effect on a periphery of a display range of the content on the first display part.

9. The control device according to claim 1, wherein the control unit is further configured to control the display screen to:
display the content in monochrome on the second display part; and display the content in color on the first display part.

10. The control device according to claim 1, wherein the control unit is further configured to:
analyze the content; and
determine the effect based on the analysis of the content.

11. The control device according to claim 10, wherein the control unit is further configured to:
analyze an image in the content; and
determine the effect based on the analysis of the image.

12. The control device according to claim 10, wherein the control unit is further configured to:
analyze sound corresponding to the content; and
determine the effect based on the analysis of the sound.

13. The control device according to claim 10, wherein
the control unit is further configured to determine the effect based on sensing data associated with the creator, and
the sensing data is associated with the creator at the time of the generation of the content.

14. The control device according to claim 10, wherein the control unit is further configured to determine the effect based on at least one of a condition of a target of the content, a condition of environment associated with the content, or a condition of the creator of the content.

15. The control device according to claim 14, wherein the control unit is further configured to determine the effect based on a score of at least one of the condition of the target of the content, the condition of the environment associated with the content, or the condition of the creator of the content.

16. The control device according to claim 1, wherein the control unit is further configured to determine the effect based on an output target of the content.

17. The control device according to claim 1, wherein
the control unit is further configured to determine the concentrating state based on action information of the creator, and
the action information of the creator corresponds to an action of the creator at the time of the generation of the content.

18. A control method, comprising:
controlling a display screen to display content on each of a first display part of the display screen and a second display part of the display screen;
acquiring biological information of a creator of the content from a plurality of sensors including a camera, a temperature sensor, and a heartbeat sensor, wherein the acquired biological information corresponds to biological information of the creator at a time of generation of the content;
determining a concentrating state of the creator of the content based on the acquired biological information of the creator;
and
changing an effect on the content between the first display part and the second display part based on the determination of the concentrating state, wherein the second display part is different from the first display part.

19. A non-transitory computer-readable medium having stored thereon, computer-executable instructions which when executed by a computer, cause the computer to execute operations, the operations comprising:
controlling a display screen to display content on each of a first display part of the display screen and a second display part of the display screen;
acquiring biological information of a creator of the content from a plurality of sensors including a camera, a temperature sensor, and a heartbeat sensor, wherein the acquired biological information corresponds to biological information of the creator at a time of generation of the content;
determining a concentrating state of the creator of the content based on the acquired biological information of the creator;
and
changing an effect on the content between the first display part and the second display part based on the determination of the concentrating state, wherein the second display part is different from the first display part.

* * * * *